US012093207B2

(12) United States Patent
Wu

(10) Patent No.: US 12,093,207 B2
(45) Date of Patent: Sep. 17, 2024

(54) SERIAL PERIPHERAL INTERFACE WITH MULTI-CONTROLLER DAISY CHAIN

(71) Applicant: CREDO TECHNOLOGY GROUP LTD, Grand Cayman (KY)

(72) Inventor: Lei (Ray) Wu, Shanghai (CN)

(73) Assignee: Credo Technology Group Limited, Grand Cayman (KY)

( * ) Notice: Subject to any disclaimer, the term of this patent is extended or adjusted under 35 U.S.C. 154(b) by 0 days.

(21) Appl. No.: 18/164,747

(22) Filed: Feb. 6, 2023

(65) Prior Publication Data

US 2024/0232125 A1 Jul. 11, 2024

(30) Foreign Application Priority Data

Jan. 6, 2023 (CN) .......................... 202310018728.6

(51) Int. Cl.
*G06F 13/42* (2006.01)
*G06F 13/16* (2006.01)

(52) U.S. Cl.
CPC ...... *G06F 13/4291* (2013.01); *G06F 13/1673* (2013.01)

(58) Field of Classification Search
CPC .......................... G06F 13/1673; G06F 13/4291
See application file for complete search history.

(56) References Cited

U.S. PATENT DOCUMENTS

2013/0297829 A1* 11/2013 Berenbaum ......... G06F 13/4256
710/36
2015/0378959 A1* 12/2015 Jones ..................... G06F 3/061
710/110
2018/0158514 A1* 6/2018 Freese ....................... G11C 5/14
2018/0276157 A1* 9/2018 Lofamia ............... G06F 13/404
2019/0171608 A1* 6/2019 Kunz ................. G06F 13/4282

(Continued)

OTHER PUBLICATIONS

Wikipedia. Serial peripheral interface. Wikimedia Foundation. Published Nov. 27, 2022. Retrieved Jan. 19, 2023, from https://en.wikipedia.org/w/index.php?title=Serial_Peripheral_Interface&oldid=1124215979.

(Continued)

*Primary Examiner* — Phong H Dang
(74) *Attorney, Agent, or Firm* — Ramey LLP; Daniel J. Krueger

(57) ABSTRACT

Techniques enabling multiple controllers to share a peripheral's serial interface as well as various systems and devices that may employ such techniques. One illustrative method includes configuring a controller to use an SPI (serial peripheral interface) bus for communication with a peripheral device only if a chain input terminal is asserted; and asserting a chain output terminal after the communication is complete. An illustrative system includes a peripheral device and multiple controller devices. The peripheral device has: a peripheral chip select terminal, a peripheral serial clock terminal, a peripheral controller output peripheral input (COPI) terminal, and a peripheral controller input peripheral output (CIPO) terminal. Each of the multiple controller devices has: a controller chip select terminal coupled to the peripheral chip select terminal, a controller serial clock terminal coupled to the peripheral serial clock terminal, a controller COPI terminal coupled to the peripheral COPI terminal, and a controller CIPO terminal coupled to the peripheral CIPO terminal.

13 Claims, 3 Drawing Sheets

(56) References Cited

U.S. PATENT DOCUMENTS

| | | | |
|---|---|---|---|
| 2020/0341934 A1* | 10/2020 | Abdul Kalam | G06F 13/1673 |
| 2022/0012196 A1* | 1/2022 | Lee | G11C 7/1063 |
| 2023/0195672 A1* | 6/2023 | Wen | G06F 1/10 |
| | | | 710/314 |

OTHER PUBLICATIONS

SPIFlash Serial Flash Memories: SpiFlash Memories with SPI, Dual-SPI, Quad-SPI and QPI. Winboard Electronics Corporation America; San Jose, CA. Feb. 2020. 2 pages.

SpiFlash—1M-Bit, 2M-Bit, 4M-Bit and 8M-Bit Serial Flash memory with 4KB Sectors and Dual Output SPI. W25X10, W25X20, W25X40, W25X80. Winbond Electronics Corp. Published Jun. 21, 2007. 48 pages.

* cited by examiner

SERIAL PERIPHERAL INTERFACE WITH MULTI-CONTROLLER DAISY CHAIN

TECHNICAL FIELD

The present disclosure relates to control of serial buses between system components, and more particularly, to techniques for enabling multiple controllers to access a peripheral device via a shared serial bus.

BACKGROUND

Most IC (integrated circuit) devices have become so complex that it is impractical for electronic device designers to design them from scratch. Instead, electronic device designers rely on predefined modular units of IC layout designs, arranging and joining them as needed to implement the various functions of the desired device. Each modular unit has a defined interface and behavior that has been verified by its creator. Though each modular unit may take a lot of time and investment to create, its availability for re-use and further development cuts product cycle times dramatically and enables better products. The predefined units can be organized hierarchically, with a given unit incorporating one or more lower-level units and in turn being incorporated within higher-level units. Many organizations have libraries of such predefined modular units for sale or license, including, e.g., embedded processors, memory, interfaces for different bus standards, power converters, frequency multipliers, sensor transducer interfaces, to name just a few. The predefined modular units are also known as cells, blocks, cores, and macros, terms which have different connotations and variations ("IP core", "soft macro") but are frequently employed interchangeably.

The modular units can be expressed in different ways, e.g., in the form of a hardware description language (HDL) file, or as a fully-routed design that could be directly printed to create a series of manufacturing process masks. Fully-routed design files are typically process-specific, meaning that additional design effort would usually be needed to migrate the modular unit to a different process or manufacturer. Modular units in HDL form require subsequent synthesis, placement, and routing steps for implementation, but are process-independent, meaning that different manufacturers can apply their preferred automated synthesis, placement, and routing systems to implement the units using a wide range of manufacturing processes. By virtue of their higher-level representation, HDL units may be more amenable to modification and the use of variable design parameters, whereas fully-routed units may offer better predictability in terms of areal requirements, reliability, and performance. While there is no fixed rule, digital module designs are more commonly specified in HDL form, while analog and mixed-signal units are more commonly specified as a lower-level, physical description.

Bus interface cores are a frequent need for device designs intended to convey information between chips and exchange information with other circuit components. One such example is the SPI bus interface core, an IC module that implements a SPI bus protocol to provide communication between local on-chip registers and other chips or circuit components. Though many standard bus protocols exist, the SPI bus protocol has proven particularly suitable for communication between microcontroller units (MCU) and external peripherals, enabling short-distance serial transfer of data at moderate speeds. It is a controller-peripheral protocol. (Though the original specification employs "master-slave" terminology, the present disclosure employs "controller-peripheral" terminology instead.)

The protocol provides for only a single bus controller that is coupled to one or more peripherals with two data lines, one clock line, and a dedicated chip select line for each peripheral, board layout and firmware-level management can become a challenge. This challenge has been previously addressed by arranging the peripherals in a daisy chain configuration, reducing pin requirements at the expense of significantly increased word lengths to populate or scan the serially-arranged registers. Moreover, there is no provision for enabling multiple controllers to share a given peripheral.

SUMMARY

Accordingly, there are disclosed herein techniques for multiple controller to share a peripheral's serial interface as well as various systems and devices that may employ such techniques. One illustrative method includes configuring a controller to use an SPI (serial peripheral interface) bus for communication with a peripheral device only if a chain input terminal is asserted; and asserting a chain output terminal after the communication is complete.

An illustrative controller device includes: a chip select terminal configured to connect with an SPI chip select line; a serial clock terminal configured to connect with an SPI serial clock line; a COPI (controller output peripheral input) terminal configured to connect with an SPI COPI line; a CIPO (controller input peripheral output) terminal configured to connect with an SPI CIPO line; a chain input terminal; a chain output terminal configured to coupled to the chain input terminal of a subsequent controller device that shares the SPI chip select line, the SPI serial clock line, the SPI COPI line, and the SPI CIPO line; and interface logic configured to: enable communication with a peripheral device via the chip select terminal, the serial clock terminal, the COPI terminal, and the CIPO terminal, once the chain input terminal is asserted until the communication is completed; disable at least the chip select terminal, the serial clock terminal, and the COPI terminal, while the chain input terminal is de-asserted or after the communication is completed; and assert the chain output terminal after the communication is completed.

An illustrative system includes a peripheral device and multiple controller devices. The peripheral device has: a peripheral chip select terminal, a peripheral serial clock terminal, a peripheral controller output peripheral input (COPI) terminal, and a peripheral controller input peripheral output (CIPO) terminal. Each of the multiple controller devices has: a controller chip select terminal coupled to the peripheral chip select terminal, a controller serial clock terminal coupled to the peripheral serial clock terminal, a controller COPI terminal coupled to the peripheral COPI terminal, and a controller CIPO terminal coupled to the peripheral CIPO terminal.

Each of the foregoing embodiments may be implemented individually or in combination, and may be implemented with one or more of the following features in any suitable combination: 1. each of the multiple controller devices has a chain input terminal and a chain output terminal to organize the multiple controller devices in a sequence, with the chain output terminal of all but a last of the multiple controller devices coupled to the chain input terminal of a next controller device in the sequence. 2. each of the multiple controller devices in turn accesses the peripheral device via the peripheral chip select terminal, the peripheral serial clock terminal, the peripheral COPI terminal, and the peripheral CIPO terminal. 3. the peripheral device includes a nonvolatile memory. 4. each controller devices includes a volatile memory that stores instructions and/or data from the nonvolatile memory. 5. each controller device retrieves the instructions and/or data from the peripheral device as part of each controller device's boot sequence. 6. each controller device has a chain input terminal and a chain output terminal to organize the multiple controller devices in a ring, with the chain output terminal of each of the multiple controller devices coupled to the chain input terminal of a next controller device in the ring. 7. each controller device uses the peripheral terminals for communication with the peripheral device only when the chain input terminal is asserted. 8. each controller device asserts the chain output terminal after finishing the communication. 9. each controller device de-asserts the chain output terminal after a predetermined delay. 10. a detection circuit that asserts a busy signal when activity is detected on at least one of the SPI chip select line, the SPI serial clock line, and the SPI COPI line. 11. the busy signal disables initiation of said communication. 12. the detection circuit asserts the busy signal when activity is detected on any one of the SPI chip select line, the SPI serial clock line, and the SPI COPI line. 13. the interface logic is configured to store data received via the SPI CIPO line in a volatile memory or buffer. 14. the interface logic is further configured to perform the communication whenever the controller device restarts.

NOMENCLATURE

Figure 1:
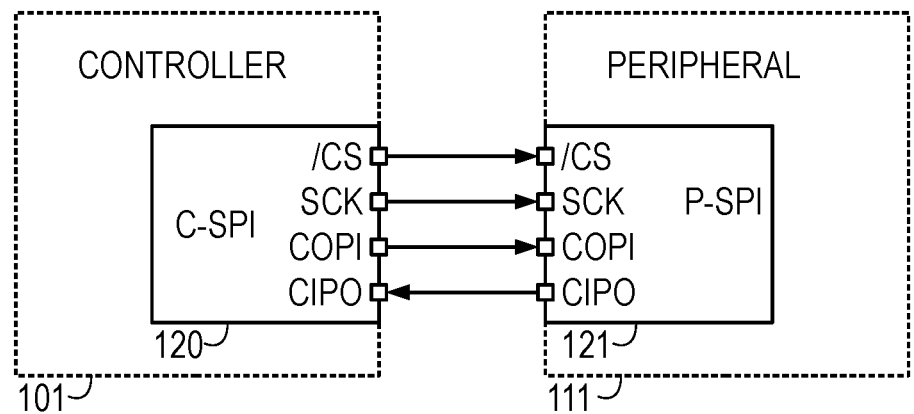
FIG. 1 is a schematic of a first illustrative SPI (serial peripheral interface) bus.

The use of the terms "approximately" or "substantially" mean that a given parameter has a value that is expected to be close to a stated value. However, as is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal.

DETAILED DESCRIPTION

While specific embodiments are given in the drawings and the following description, keep in mind that they do not limit the disclosure. On the contrary, they provide the foundation for one of ordinary skill to discern the alternative forms, equivalents, and modifications that are encompassed in the scope of the appended claims.

Embedded systems often have a nonvolatile memory that stores firmware for a programmable microcontroller unit (MCU), central processing unit (CPU), digital signal processor (DSP), or the like, to retrieve and use, particularly as part of a boot-up process whenever the system is powered up or reset. The nonvolatile memory can take the form of a read-only memory (ROM) chip, a programmable ROM (PROM), a flash memory, or any of the available variations of such technology. Suitable flash memory devices include Winbond's W25X and W25Q series, Microchip's SST25 series, among other compatible devices. The combination of low pin count and moderately high data rates that the SPI bus provides make it a desirable option for communication between the nonvolatile memory and the MCU of an embedded system. The nonvolatile memory device may act as an SPI bus peripheral, while the MCU acts as the SPI bus controller.

FIG. 1 shows a controller device 101 coupled to a peripheral device 111 via an SPI bus. The controller device 101 includes an SPI bus controller interface (C-SPI) module 120 while the peripheral device 111 includes an SPI bus peripheral interface (P-SPI) module 121. The modules may be implemented as application specific integrated circuitry (ASIC), configurable logic blocks such as those found in field-programmable gate arrays (FPGAs), firmware executed by a microcontroller, or a combination thereof.

The C-SPI module 120 communicates with the P-SPI module 121 via terminals that convey a chip select (CS) signal, the clock (SCK) signal, the controller output peripheral input (COPI) signal, and the controller input peripheral output (CIPO) signal. The P-SPI module 121 includes a matching set of terminals. The terminals can be nodes internal to an integrated circuit, or they may connect to pads or pins for conveying the signals from the die containing the module to signal conductors for conveying the signals from the die to another die or to another separately packaged chip. The "/" in the drawings indicates that the CS signal is an "active-low" signal which is asserted by driving the signal to a voltage representing a logical "0" and de-asserted by driving the signal to a voltage representing a logical "1". The de-assertion can alternatively be performed by isolating the terminal to place it in a high-impedance state, permitting a pull-up resistance elsewhere in the system to raise the signal line voltage.

Figure 2:
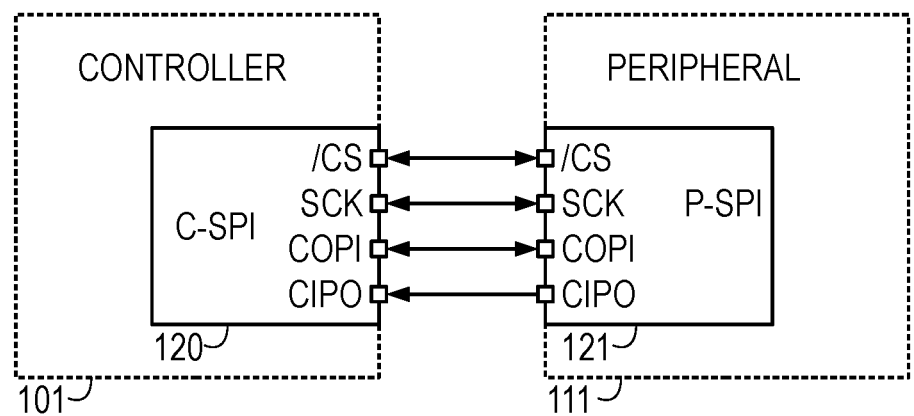
FIG. 2 is a schematic of a second illustrative SPI bus.

In accordance with the original SPI specification, the C-SPI module 120 in FIG. 1 asserts the CS signal line to initiate communication with the P-SPI module 121 and drives the SCK signal line in an alternating fashion to clock the transfer of bits to the peripheral on the COPI signal line and to receive bits from the peripheral on the CIPO signal line. To provide for higher data transfer rates, the SPI specification has been enhanced in various ways. For example, the P-SPI module 121 can be configured to drive the SCK signal line when sending data on the CIPO signal line, enabling a higher bit rate. Note that this causes the bus to operate in a half-duplex fashion, and the P-SPI may drive the CS signal line to signal when it is transmitting data. The P-SPI module 121 can be further configured to also send data to the C-SPI module 120 on the COPI signal line as well as the CIPO line, thereby doubling the data transfer bandwidth. This is sometimes referred to as "Dual SPI mode". FIG. 2 shows the bi-directional signal flows provided with these enhancements.

We note here that some P-SPI modules may employ additional terminals as lanes for additional data signals being transmitted to the C-SPI module 120, thereby further increasing the data transfer width (e.g., "Quad SPI mode"). Though not expressly described below, such additional signal lines can also be employed in the systems and methods described below. Conversely, though the systems and methods described below provide for the use of bidirectional CS, SCK, and COPI signal lines, they can be used with the unidirectional signal lines provided by the original SPI specification.

As with standalone computer systems, embedded systems are achieving enhanced performance through the use of parallelism, including the use of multiple programmable MCUs to distribute the computational tasks. Though of course each MCU can be provided with its own nonvolatile memory device accessible by a corresponding SPI bus, it is more cost-efficient to have the multiple MCUs share the nonvolatile memory device via a common SPI bus. However, the SPI specification does not support the use of multiple controllers. Accordingly, there is provided herein an embedded system having an SPI bus augmented with a daisy-chain signaling arrangement to accommodate multiple controllers.

Figure 3:
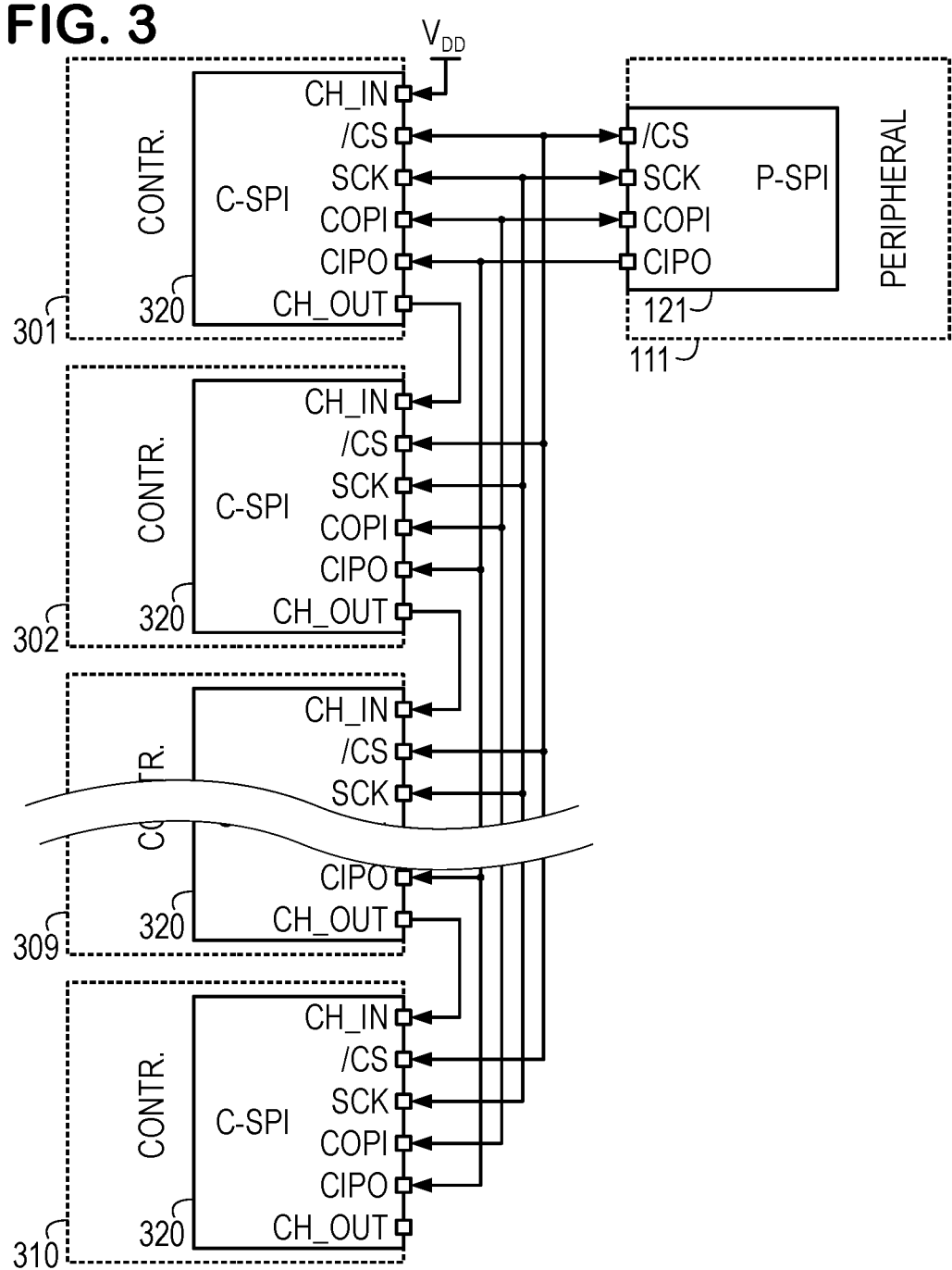
FIG. 3 is a schematic of an illustrative multi-controller SPI bus.

FIG. 3 shows an illustrative system having the peripheral device 111 with the P-SPI module 121 with its terminals coupled to each of multiple controller devices 301-310. Each controller device includes an enhanced C-SPI module 320 having not only the CS, SCK, COPI, and CIPO terminals, but also a chain input (CH_IN) terminal and a chain output (CH_OUT) terminal. The CH_IN and CH_OUT terminals enable the C-SPI modules 320, and thus the controller devices 301-310, to be organized in a daisy-chain arrangement for coordination. As an alternative, the CH_IN and CH_OUT terminals may be used to organize the controller devices into a ring arrangement.

In the daisy-chain arrangement, all but the last of the controller devices 310 has its CH_OUT terminal coupled to the CH_IN terminal of the subsequent controller device. The CH_OUT terminals are de-asserted until the controller device is finished acting as the SPI bus controller, and each controller device waits for the CH_IN terminal to be asserted before taking control of the SPI bus.

To initiate operations, the CH_IN terminal of the first controller device 301 is asserted, e.g., by tying the terminal to a positive power supply voltage VDD. Upon detecting the assertion of the CH_IN terminal, controller device 301 employs the CS, SCK, COPI, and CIPO terminals to access the peripheral device 111, e.g., to retrieve firmware for the controller device 301 to store in volatile memory and execute. When finished with the peripheral device 111, controller device 301 may disable at least the CS, SCK, and COPI terminals, e.g., disconnecting them from any voltage supplies to permit the corresponding bus lines to be driven externally. To signal that it is finished using the bus, controller device 301 asserts the CH_OUT terminal. The next controller device detects this assertion on its CH_IN terminal and repeats the process. In this fashion, multiple controllers can share the SPI bus while avoiding bus conflicts.

Figure 4:
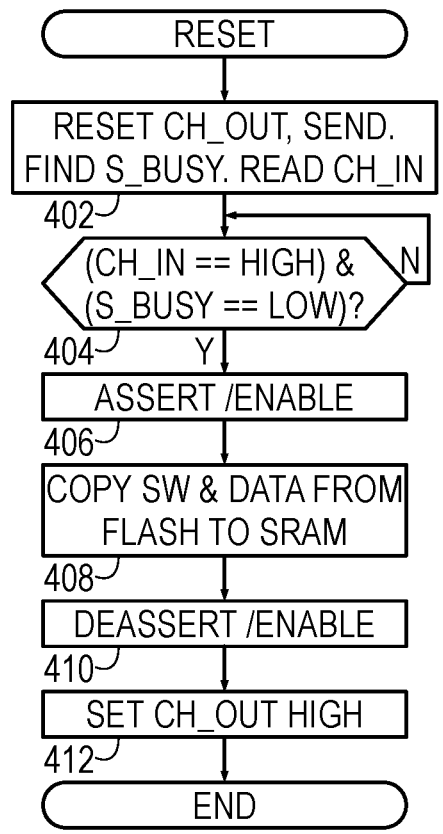
FIG. 4 is a flow diagram of an illustrative multi-controller bus protocol.

FIG. 4 is a flow diagram of a bus controller method that may be implemented by the C-SPI module 320 in each of the multiple bus controller devices 301-310. In block 402, the C-SPI module 320 initializes its internal registers, resetting the bits that control the CH_OUT terminal and control the module's configuration for driving the SPI bus lines (SEND status). The C-SPI module 320 further formulates a busy signal (S_BUSY status) that indicates whether any activity is currently detected on the SPI bus. The assertion status of the CH_IN terminal is buffered and monitored to trigger the C-SPI module's operation as the SPI bus controller.

In block 404, the C_SPI module 320 tests if the CH_IN terminal is asserted and the bus activity is complete (S_BUSY is low). Once these conditions are both true, in block 406 the C-SPI module 320 begins operating as the SPI bus controller, asserting an internal enable signal (the "/" in the figures indicates that the signal is asserted by driving it low). Once the enable signal is asserted, the C-SPI module employs a standard SPI bus communications protocol in block 408 to access the peripheral device 111 to, e.g., retrieve configuration data and software from nonvolatile memory and store it locally in volatile memory for use by the controller device. Communication between the controller and the serial flash device can take many clock cycles, perhaps including multiple commands for erasing, writing and reading data. Once the copying is complete, in block 410 the C-SPI module 320 deasserts the enable signal, ceasing control of the SPI bus. In block 412, the C-SPI module asserts the CH_OUT terminal.

Figure 5:
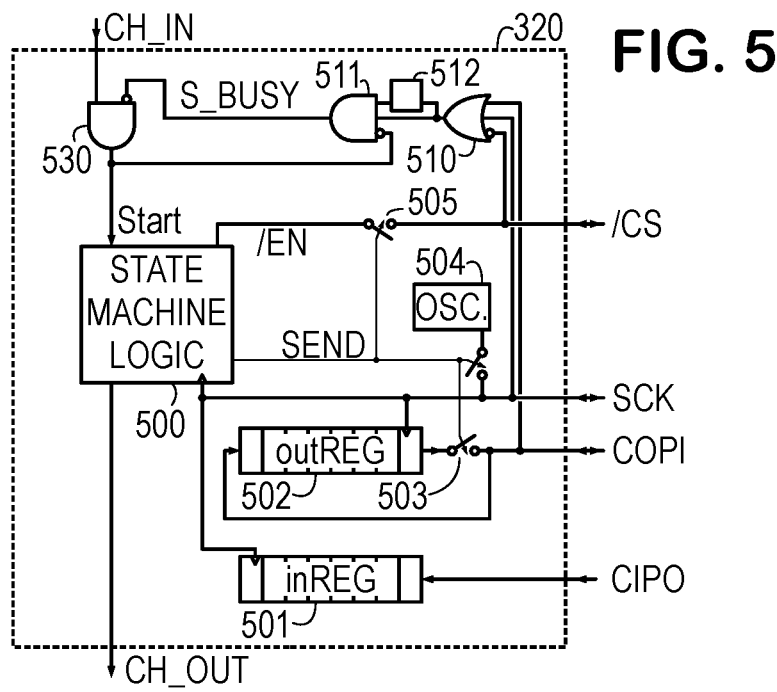
FIG. 5 is a schematic of an illustrative SPI bus interface.

FIG. 5 shows an illustrative C-SPI module schematic, having state machine logic 500 that implements a standard SPI bus communication protocol when enabled. The state machine logic can be implemented as application specific integrated circuitry, as configurable logic, as a programmable controller or processor executing program instructions, or as any combination thereof.

When clocked, an input register 501 accepts a sequence of bits from the CIPO terminal. The state machine logic 500 can periodically transfer the contents of the input register to a buffer and/or volatile memory of the controller device via an internal parallel bus (not shown). An output register 502 supplies a sequence of bits to the COPI terminal when switch 503 is closed. The illustrated output register 502 is also configured to accept a sequence of bits from the COPI terminal when the peripheral device is sending. The state machine logic 500 can periodically transfer the contents of the output register to the buffer or volatile memory, and conversely can load the output register 502 with bits from an internal source.

The state machine logic 500 can selectively couple a clock generator 504 to the input and output registers 501, 502 when transmitting, and can decouple the clock generator when receiving to enable the registers to be driven from the SCK terminal. Another switch 505 may couple the enable signal to the CS terminal when the C-SPI module is transmitting and decouple the CS terminal when receiving. The state machine logic may use a SEND signal to close the switches when sending and to open the switches when receiving.

In FIG. 5, a logical OR gate 510 combines signals from the CS, SCK, and COPI terminals, asserting its output whenever any of these are asserted. To screen for only those assertions that last for a predetermined time, such as 10 microseconds, a delay element 512 delays the output signal for the predetermined time. A logical AND gate 511 asserts the busy signal if both the original and delayed output signal are asserted. The logical AND gate 511 accepts a third input to block assertion of the busy signal after the C-SPI module 320 has taken control of the SPI bus. Another logical AND gate 530 triggers the operation of the state machine logic 500 when the CH_IN terminal is asserted and previous activity has ceased on the SPI bus.

The foregoing methods, modules, and circuits provide an effective way for multiple microcontrollers to chare a single SPI flash memory device. The daisy-chain provide bus access scheduling, preventing collisions as multiple bus controllers attempt to access a shared resource such as a flash memory device that stores the read-only memory (ROM) code or other data needed by more than one controller during startup.

Numerous alternative forms, equivalents, and modifications will become apparent to those skilled in the art once the above disclosure is fully appreciated. It is intended that the claims be interpreted to embrace all such alternative forms, equivalents, and modifications that are encompassed in the scope of the appended claims.

What is claimed is:

1. An apparatus that comprises:
a peripheral device having:
   a peripheral chip select terminal,
   a peripheral serial clock terminal,
   a peripheral controller output peripheral input (COPI) terminal, and
   a peripheral controller input peripheral output (CIPO) terminal; and
multiple controller devices each having:
   a controller chip select terminal coupled to the peripheral chip select terminal,
   a controller serial clock terminal coupled to the peripheral serial clock terminal,
   a controller COPI terminal coupled to the peripheral COPI terminal, and
   a controller CIPO terminal coupled to the peripheral CIPO terminal,
wherein each of the multiple controller devices has a chain input terminal and a chain output terminal to organize the multiple controller devices in a bootup sequence, with the chain output terminal of all but a last of the multiple controller devices coupled to the chain input terminal of a next controller device in the bootup sequence.

2. The apparatus of claim 1, wherein each of the multiple controller devices in turn accesses the peripheral device via the peripheral chip select terminal, the peripheral serial clock terminal, the peripheral COPI terminal, and the peripheral CIPO terminal.

3. The apparatus of claim 2, wherein the peripheral device comprises a nonvolatile memory, and wherein each of the multiple controller devices comprises a volatile memory that stores instructions and/or data from the nonvolatile memory.

4. The apparatus of claim 3, wherein each of the multiple controller devices retrieves the instructions and/or data from the peripheral device as part of each controller device's boot process.

5. A controller device that comprises:
a chip select terminal configured to connect with an SPI (serial peripheral interface) chip select line;
a serial clock terminal configured to connect with an SPI serial clock line;
a COPI (controller output peripheral input) terminal configured to connect with an SPI COPI line;
a CIPO (controller input peripheral output) terminal configured to connect with an SPI CIPO line;
a chain input terminal;
a chain output terminal configured to coupled to the chain input terminal of a subsequent controller device that shares the SPI chip select line, the SPI serial clock line, the SPI COPI line, and the SPI CIPO line, the chain input terminal and chain output terminal serving to organize the controller device and the subsequent controller device in a bootup sequence; and
interface logic configured to:
   enable communication with a peripheral device via the chip select terminal, the serial clock terminal, the COPI terminal, and the CIPO terminal, once the chain input terminal is asserted until the communication is completed;
   disable at least the chip select terminal, the serial clock terminal, and the COPI terminal, while the chain input terminal is de-asserted or after the communication is completed; and
   assert the chain output terminal after the communication is completed.

6. The controller device of claim 5, further comprising a detection circuit that asserts a busy signal when activity is detected on at least one of the SPI chip select line, the SPI serial clock line, and the SPI COPI line, the busy signal disabling initiation of said communication.

7. The controller device of claim 6, wherein the detection circuit asserts the busy signal when activity is detected on any one of the SPI chip select line, the SPI serial clock line, and the SPI COPI line.

8. The controller device of claim 5, further comprising a volatile memory or buffer, the interface logic being configured to store data received via the SPI CIPO line in the volatile memory or buffer.

9. The controller device of claim 8, wherein the interface logic is further configured to perform the communication whenever the controller device restarts.

10. The controller device of claim 5, wherein the interface logic asserts the chain output terminal for at most a predetermined time after the communication is completed.

11. A method implemented in each of multiple controller devices sharing an SPI (serial peripheral interface) bus for communication with a peripheral device, the method comprising:
in each of the multiple controller devices, the multiple controller devices each having a chain input terminal and a chain output terminal to define a bootup sequence for the multiple controller devices:
   enabling communication with a peripheral device via an SPI (serial peripheral interface) bus once the chain input terminal is asserted until the communication is completed;
   disabling said communication while the chain input terminal is de-asserted or after the communication is completed; and
   asserting the chain output terminal after the communication is completed.

12. The method of claim 11, further comprising:
monitoring the SPI bus for activity; and
asserting a busy signal when detecting activity on the SPI bus, the busy signal inhibiting initiation of said communication while asserted.

13. The method of claim 11, wherein the communication retrieves firmware from the peripheral device for storage in a local memory.

* * * * *